May 24, 1927.
J. H. COLEMAN
FISH ELEVATOR
Filed Aug. 11, 1925
1,630,169
2 Sheets-Sheet 1
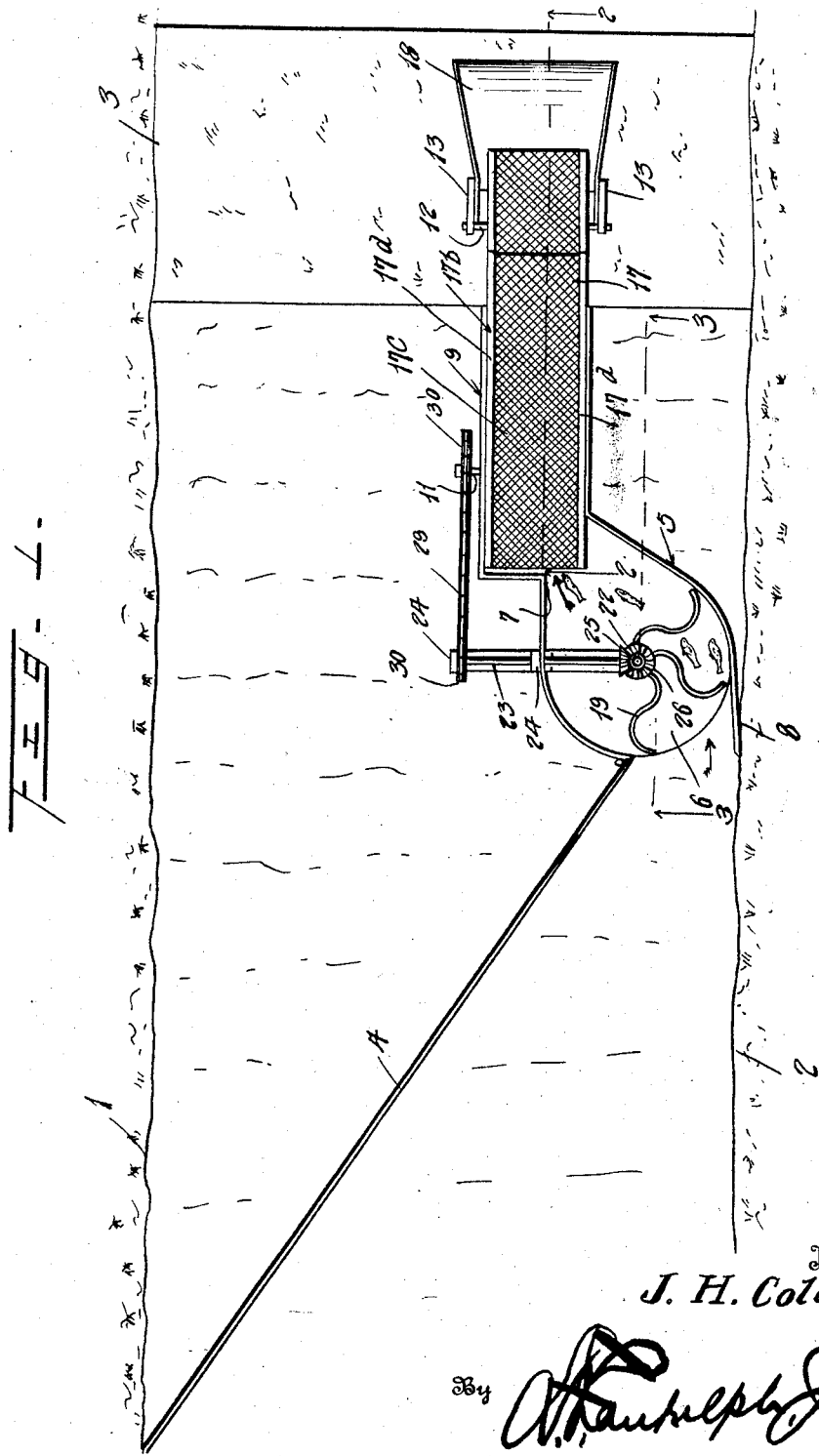
Inventor
J. H. Coleman May 24, 1927.
J. H. COLEMAN
FISH ELEVATOR
Filed Aug. 11, 1925
2 Sheets-Sheet 2
1,630,169
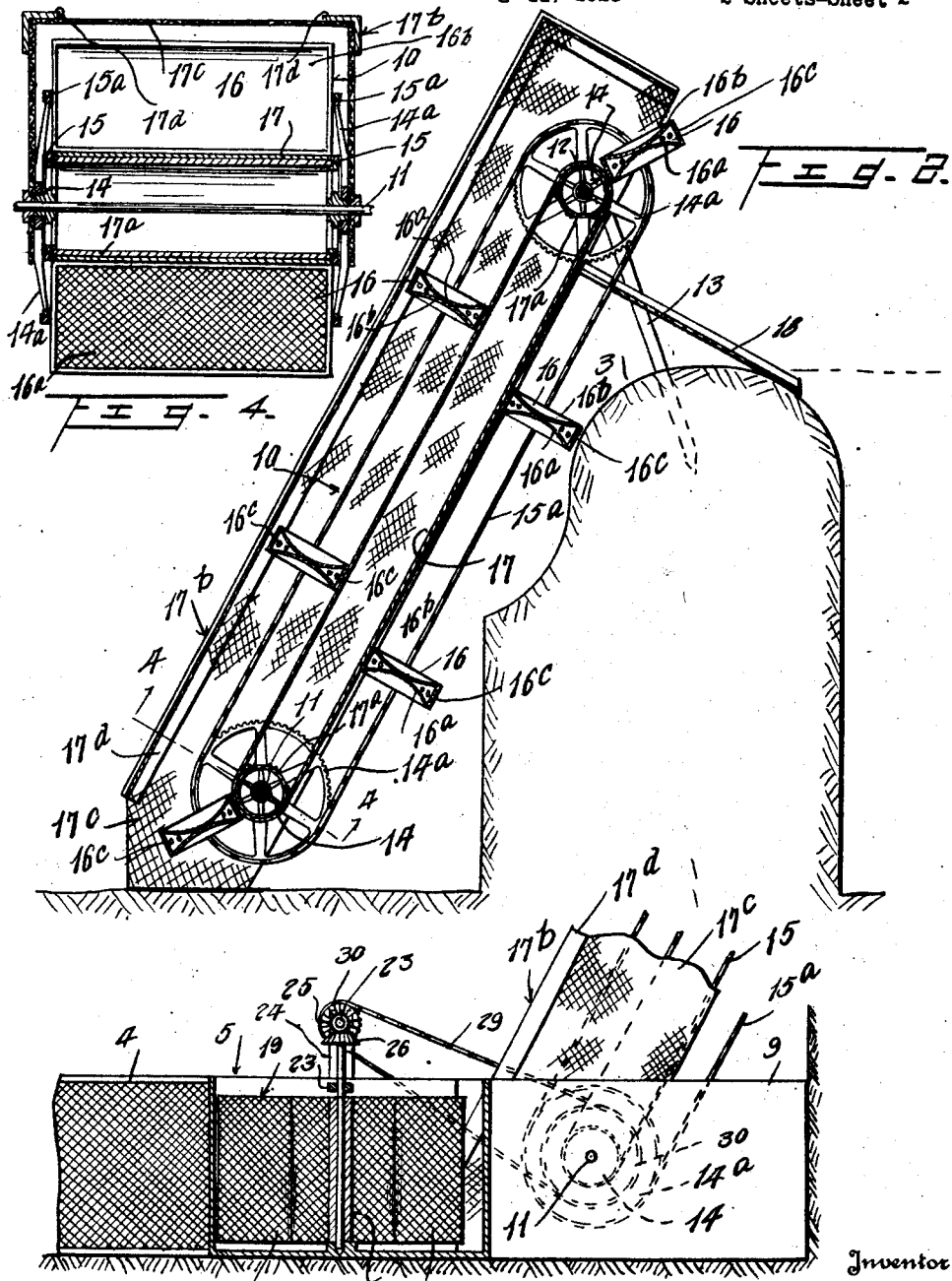
Inventor
J. H. Coleman, Patented May 24, 1927.

1,630,169

UNITED STATES PATENT OFFICE.

JOHN H. COLEMAN, OF HANFORD, CALIFORNIA.

FISH ELEVATOR.

Application filed August 11, 1925. Serial No. 49,677.

This invention has for one of its objects the provision of a novel and simple device for lifting fish from lower to higher levels of rivers and creeks, and comprehends the employment of an elevator and means for directing the fish to the elevator.

The invention is hereinafter fully described and claimed, and illustrated in the accompanying drawings, wherein:

Figure 1 is a top plan view illustrating the application of the invention;

Figure 2 is a sectional view taken on the vertical plane indicated by the line 2—2 of Figure 1;

Fig. 3 is a sectional view taken on the vertical plane indicated by the line 3—3 of Figure 1, and Figure 4 is a sectional view taken on the plane indicated by the line 4—4 of Figure 2.

Corresponding and like parts are referred to in the following description, and designated in the several views of the accompanying drawings, by similar reference characters.

Higher and lower water levels are formed in rivers and creeks by barriers, such as natural earth formations and dams, over which the water flows and which in some instances are so high that the fish cannot jump from the lower to the higher level. In the drawings there is shown such a barrier, which in this instance consists of a dam, and the application of my invention for carrying the fish over the barrier.

In the drawings 1 and 2 designate the embankments of a river or creek and 3 a barrier at the opposite sides of which the water is at different levels. In accordance with my invention a fish weir leader 4 is arranged in the lower level of the body of water, and extends diagonally from the embankment 1 in the direction of the embankment 2. The weir 4 terminates at some distance from the embankment 2 and positioned between this end of the weir and this embankment is an elevator well or fishpond 5. The weir 4 is made of heavy wire cloth with meshes small enough to prevent fish from passing therethrough. The well 5 is of substantially cylindrical formation, and is provided with an entrance 6 and an exit 7. The weir 4 is connected to one side of the entrance 6, and a guard 8 extends from the other side of the entrance to the embankment 2, said weir and guard serving to direct the fish to the entrance of the well. A trough 9 communicates with the exit 7 of the well 5 and extends therefrom to the barrier 3. The well 5, guard 8 and trough 9 may be made of any material or materials suitable for the purpose, and these parts and the weir 4 may be anchored in the lower level of the body of water in any suitable manner.

An elevator or conveyor 10 extends upwardly from the trough 9 to a point above the barrier 3, and comprises a bottom shaft 11 journaled in the sides of the trough 9, a top shaft 12 journaled in bearings supported by pedestals 13 anchored in and extending upwardly from the top of the barrier 3, sprocket wheels 14 and 14$^a$ fixed to the shafts 11 and 12, sprocket chains 15 passing about the smaller sprocket wheels 14, sprocket chains 15$^a$ passing about the larger sprocket wheels 14$^a$ and brackets 16 secured at their inner sides to the chains 15 and at their ends to the chains 15$^a$. A belt 17 of canvas or other suitable material passing about drums 17$^a$ fixed to the sprocket wheels 14, and a casing or flume 17$^b$ extending over the upper end and lateral and top sides of the elevator, prevent the fish from jumping from the brackets 16 while being carried from the lower to the higher level of the body of water. The casing 17$^b$ is preferably made of wire cloth 17$^c$ fixed to an angle iron frame 17$^d$. The lower end of the elevator 10 is located in close proximity to the exit 7, and located below the upper end thereof is a chute 18 which receives the fish from the buckets 16 and directs them into the higher level of the body of water.

The buckets 16 are each large enough to carry several fish and are provided with perforated bottoms 16$^a$ and imperforate bottoms 16$^b$. Openings 16$^c$ are formed in the sides and ends of the buckets 16 between the bottoms 16$^a$ and 16$^b$. The perforated bottoms 16$^a$ are disposed uppermost during the up travel and the imperforate bottoms 16$^b$ uppermost during the down travel of the buckets 16.

To insure passage of the fish from the well 5 into the buckets 16, a herder 19 is provided. The herder 19 is located in the well 5, and comprises a hub 20 and blades 21. The hub 20 is fixed to a shaft 22 journaled in the well 5, and the blades 21 are made of heavy wire cloth and are of substantially S-shaped formation in horizontal section. The mesh of the blades 21 is small enough to prevent the passage of fish therethrough. A shaft 23 journaled in bearings 24 is provided with a bevel gear 25 which meshes with a bevel gear 26 fixed to the shaft 22. A driving connection is established between the shafts 11 and 23 by a sprocket chain 29 and wheels 30.

As the bottoms 16$^a$ and the sides and ends of the buckets 16 are perforated the upper flight of buckets will while passing through the water flowing over the barrier 3, offer comparatively little resistance to the movement of the elevator 10 and herder 19.

If the flow of water over the barrier is sufficient the impact thereof against the imperforate bottoms 16$^b$ of the lower flight of buckets 16 will impart motion to the elevator 10 and herder 19. If the flow of water is not sufficient to operate these parts, an electric or other motor can be employed for this purpose and connected to either of the shafts 11 or 23.

From the foregoing description, taken in connection with the accompanying drawings, it will be apparent that as the fish advance toward the barrier 3 their passageway becomes narrower and that at the narrowest portion of the passageway is located the well 5. The fish will thus be directed into the well 5 and swept by the herder 19 into the trough 9. The buckets 16 will pick up the fish from the trough 9 and discharge them into the chute 18 by which they are directed into the water beyond the barrier 3.

It should be understood that the drawings are merely illustrative and do not pretend to give exact proportions. Furthermore, the said drawings are illustrative of a preferred construction, it being my expectation that various changes and modifications may be made without departing from the spirit and scope of my invention.

What is claimed is:

1. A device for carrying fish over a barrier, a well provided with an entrance and exit, a weir and guard extending in opposite directions from said entrance, a trough communicating with said exit, a herder located in the well, an elevator extending upwardly from the trough and provided with buckets, and a driving connection between the elevator and herder.

2. A device for carrying fish over a barrier, comprising an elevator adapted to be operated by the water flowing over the barrier, and means adapted to direct the fish into the elevator.

3. A device for carrying fish over a barrier, comprising an elevator adapted to be operated by the water flowing over the barrier, means for directing fish to the elevator and including a rotatable herder, and means connecting the elevator to the herder to permit the former to rotate the latter.

4. A device for carrying fish over a barrier, comprising upper and lower shafts, supporting means for the shafts, an endless member passing about the shafts, buckets secured to the member and provided with perforated and imperforate bottoms, the perforated bottoms of the buckets being disposed uppermost during the up travel of the buckets and the imperforate bottoms of the buckets being disposed uppermost and in the path of the water flowing over the barrier during the down travel of the buckets, and means for directing fish to the up traveling buckets.

5. A device for carrying fish over a barrier, comprising an elevator provided with buckets, a belt with which the buckets travel, a casing about the elevator, and means for directing fish to the elevator, said belt and casing being adapted to prevent the fish from jumping from the buckets while being carried over the barrier.

6. A device for carrying fish over a barrier, comprising a well located below the top of the barrier and provided with an entrance and an exit, elevating means extending upwardly from the exit of the well, and means located in the well and adapted to compel the fish to pass therethrough to the elevator.

In testimony whereof I affix my signature.

JOHN H. COLEMAN.